United States Patent [19]

Adams

[11] Patent Number: 5,101,731
[45] Date of Patent: Apr. 7, 1992

[54] PROPELLANT GRAIN ASSEMBLY FOR A GAS GENERATOR

[75] Inventor: Kenneth E. Adams, Manassas, Va.

[73] Assignee: The United States of America as represented by the Secretary of the Navy, Washington, D.C.

[21] Appl. No.: 621,103

[22] Filed: Nov. 30, 1990

[51] Int. Cl.⁵ ............................................. C06D 5/00
[52] U.S. Cl. ..................................... 102/290; 102/530
[58] Field of Search ............... 102/530, 531, 202, 290; 60/253, 256

[56] References Cited

U.S. PATENT DOCUMENTS

| | | | |
|---|---|---|---|
| 2,921,521 | 1/1960 | Haye et al. | 102/530 |
| 3,107,620 | 10/1963 | O'Donnell | 60/253 |
| 3,173,370 | 3/1965 | Landry, Jr. et al. | 102/202 |
| 3,256,819 | 6/1966 | Leeper | 102/530 |
| 4,007,685 | 2/1977 | Nimylowycz | 102/530 |

FOREIGN PATENT DOCUMENTS 2221162 11/1972 Fed. Rep. of Germany ........ 60/253
2241696 3/1975 France .................................. 60/253

Primary Examiner—Michael J. Carone
Attorney, Agent, or Firm—Kenneth L. Warsh; Robert Wohlfarth

[57] ABSTRACT

A gas generator for a long range missile is driven by a solid propellant grain assembly which includes a cylindrical inhibitor, a forward closure assembly that is attached to one end of the inhibitor and a propellant grain that is cast into the cylindrical cavity formed by the interior surface of the cylindrical inhibitor. Between the grain and inhibitor and between the grain and forward closure assembly is an adhesive bonding system for attaching the grain to the inhibitor and forward closure assembly. The exposed or aft end of the grain is the initial burning surface and includes a plurality of annular concentric grooves and a configuration that provides optimum burn progression that results in a complete high pressure burn. The external surface of the inhibitor is machined so that the solid propellant grain assembly may be readily inserted and removed from the gas generator.

2 Claims, 7 Drawing Sheets

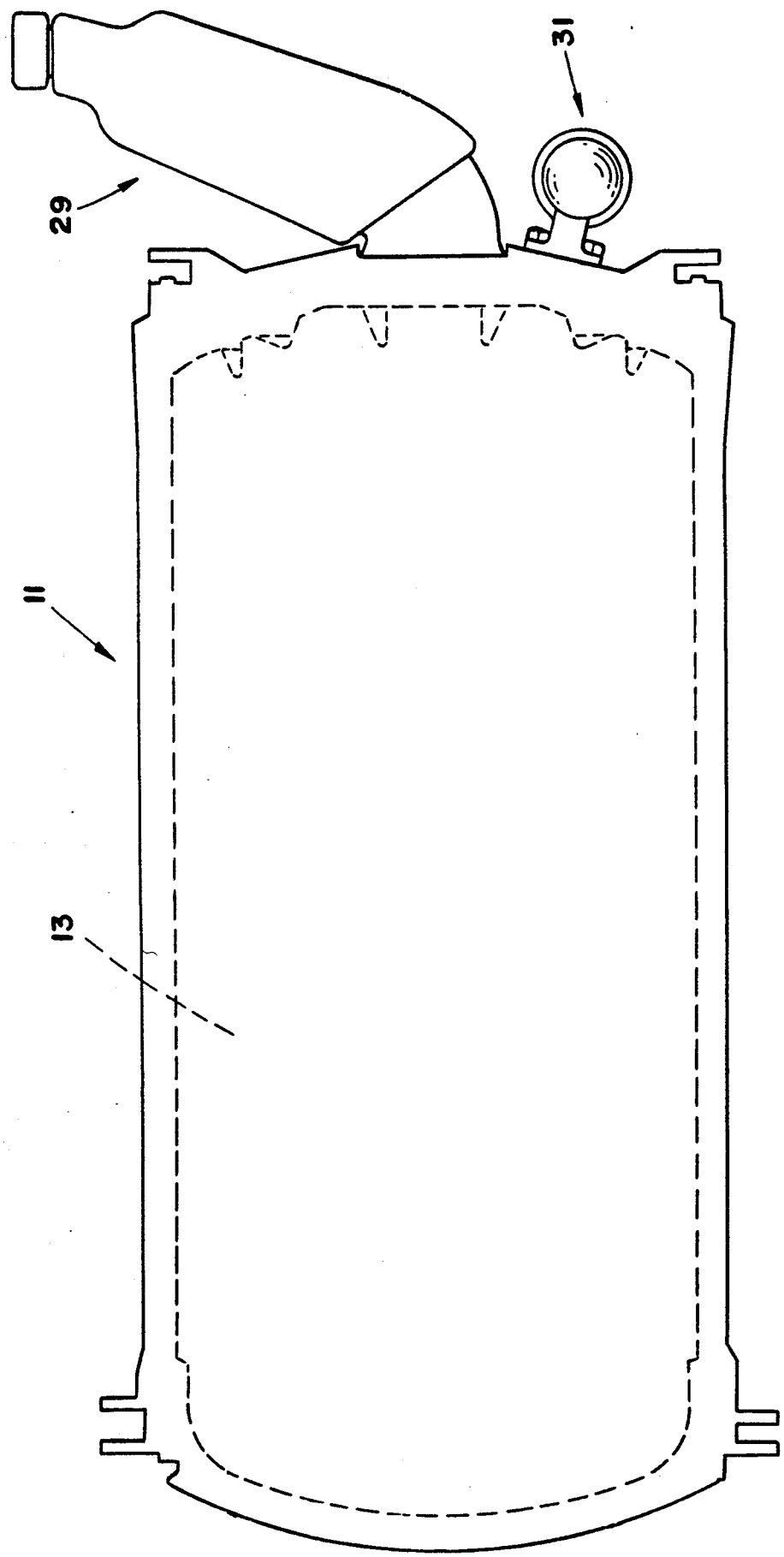
FIG_1

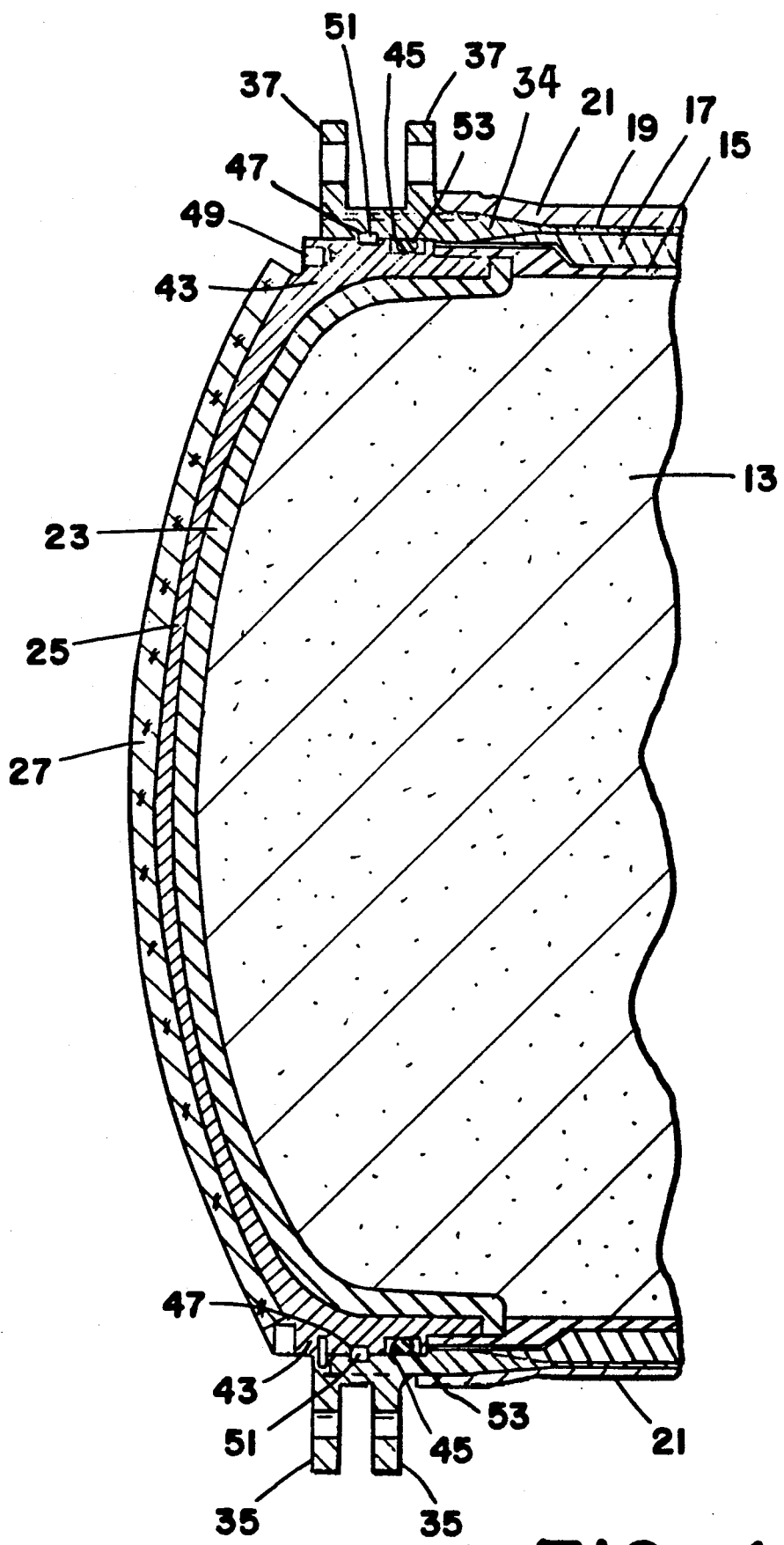
FIG_1A

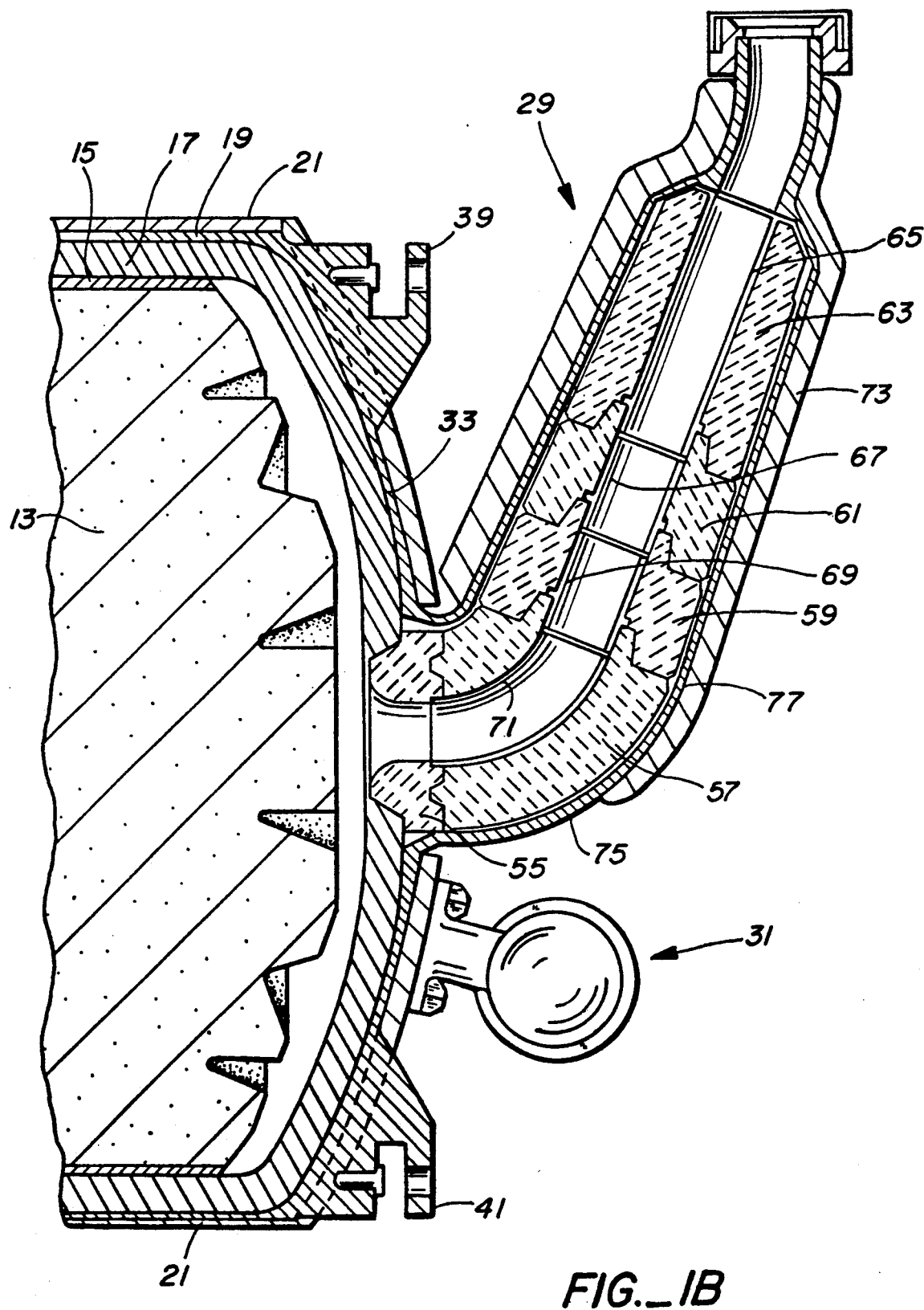
FIG._1B

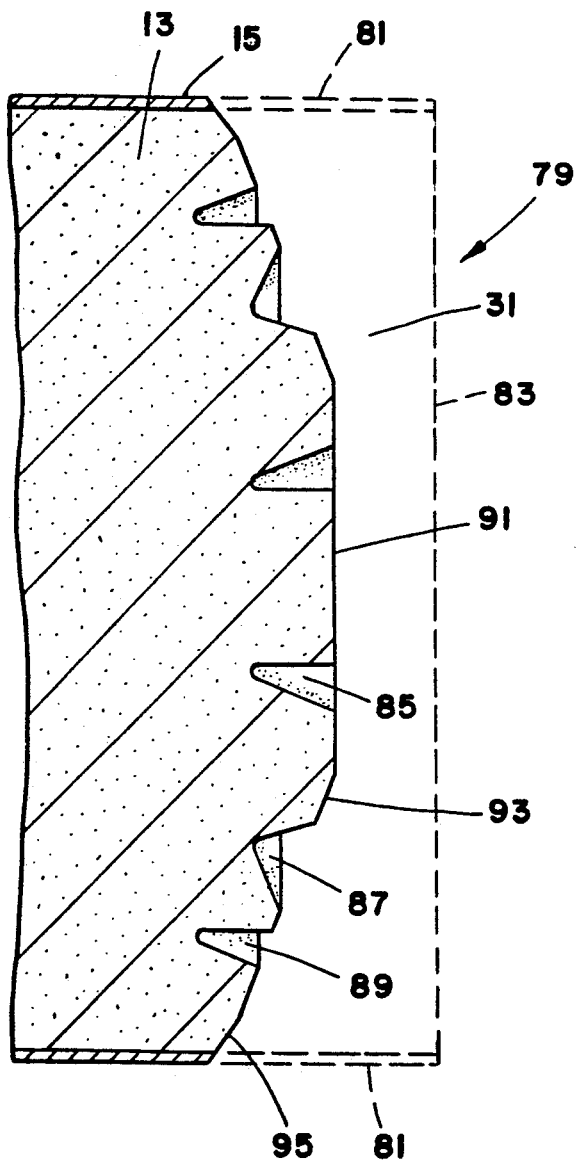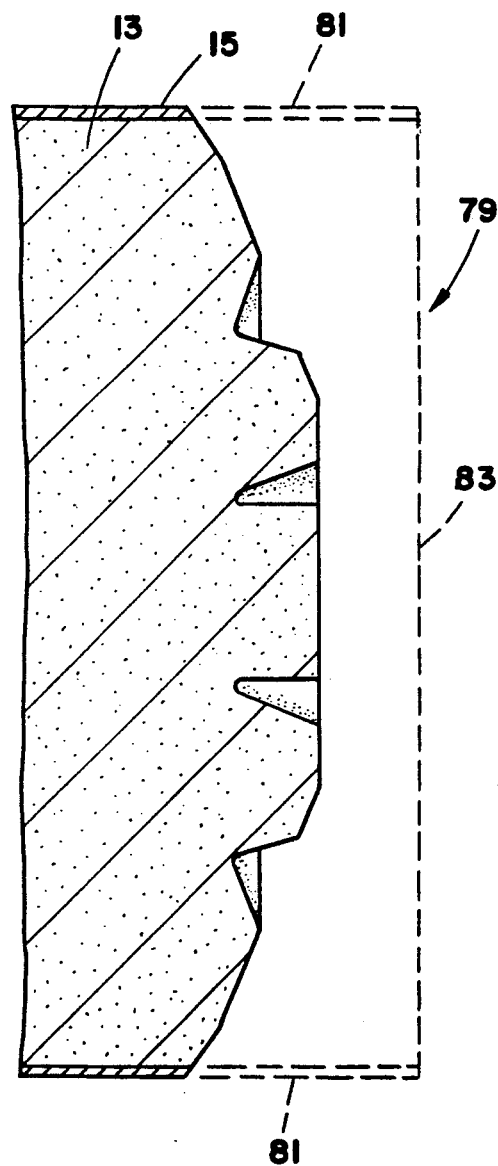
FIG_2  FIG_5

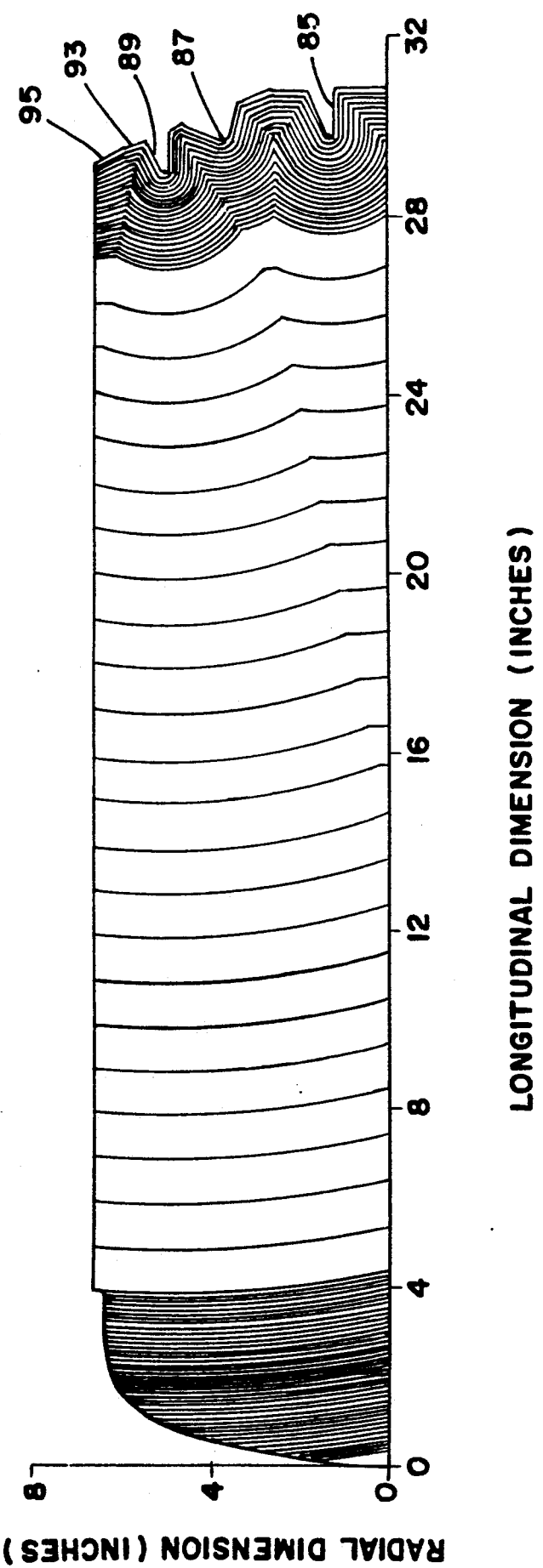
FIG_3

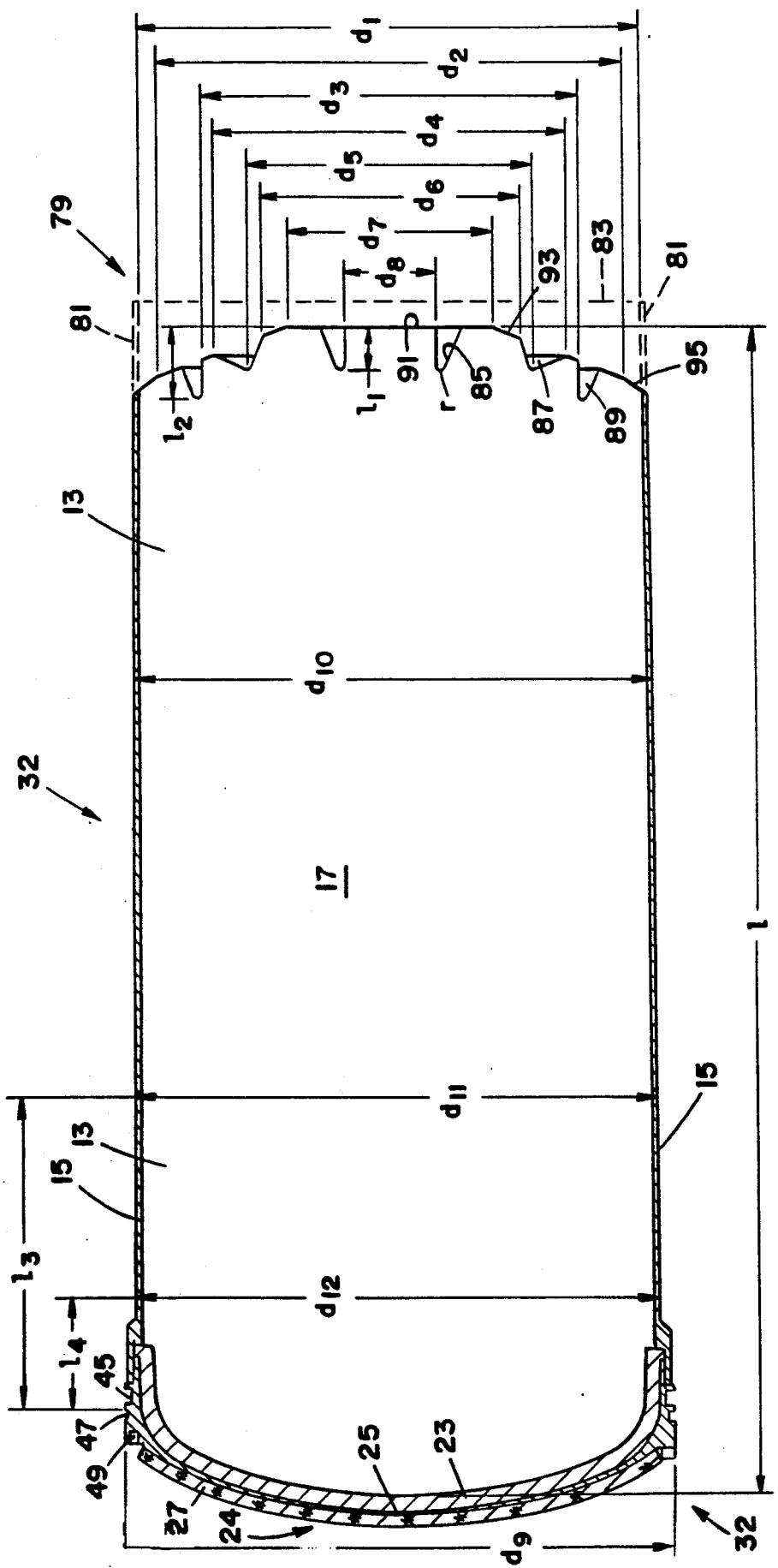
FIG_6

PROPELLANT GRAIN ASSEMBLY FOR A GAS GENERATOR

FIELD OF THE INVENTION

The present invention relates to gas generators and more particularly, but without limitation thereto, to the design of the solid propellant grain assembly for use in the gas generator.

BACKGROUND OF THE INVENTION

Modern guided missiles need high performance gas generators for providing gas to control nozzles of post-boost control systems. This provides gas energy to achieve forward, reverse, pitch, yaw and roll control of the missile equipment and re-entry body sections. Prior art techniques have not provided the high performance required for advanced weapon systems that must undergo severe operating environments and have high pressure long time period burn requirements. Moreover, a modern weapon system often has long storage life requirements wherein propellants that have excessively aged may be inexpensively replaced with fresh propellants. These and other requirements have been accomplished by the gas generator solid propellant grain assembly of the present invention.

OBJECTIVES OF THE INVENTION

It is therefore a primary objective of the present invention to provide a solid propellant grain assembly to withstand the severe operating conditions of an intercontinental ballistic missile system.

Still another object of the present invention is to provide the high energy gas requirements of a missile post boost control system.

A further object of the present invention is to provide an efficient, reliable and cost effective gas generator propellant grain assembly for a missile system.

SUMMARY OF THE INVENTION

These objects of the invention and other objects, features and advantages to become apparent as the specification progresses are accomplished by the invention according to which, briefly stated, the gas generator solid propellant grain assembly includes a cylindrical inhibitor, a forward closure assembly that is attached to one end of the inhibitor and a propellant grain that is cast into the cylindrical cavity formed by the interior surface of the cylindrical inhibitor. Between the grain and inhibitor and between the grain and forward closure assembly is an adhesive bonding system for attaching the grain to the inhibitor and forward closure assembly. The exposed or aft end of the grain is the initial burning surface and includes a plurality of annular concentric grooves and a configuration that provides optimum burn progression that results in a complete high pressure burn. The external surface of the inhibitor is machined so that the solid propellant grain assembly may be readily inserted and removed from the gas generator.

LIST OF ADVANTAGES OF THE INVENTION

Important advantages of the present invention include having a gas generator solid propellant grain assembly that provides complete burn, optimum burning surface area progression, high pressure over the required time period, maximal propellant weight and ease of manufacture, low cost and a readily replaceable propellant grain assembly.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

BRIEF DESCRIPTION OF THE DRAWINGS

FIG. 1 is an overall side elevation sectional view of the gas generator assembly with which the solid propellant grain assembly of the present invention is used.

FIG. 1A is a sectional view of the forward section of FIG. 1

FIG. 1B is a sectional view taken of the aft section of FIG. 1.

FIG. 2 is a sectional view of the aft end of the solid grain assembly.

FIG. 3 is the burn-back pattern of the grain shown in FIG. 2.

FIG. 5 is an alternate design of the configuration of the initial burn area.

FIG. 6 is a sectional view of the propellant grain assembly.

GLOSSARY

Figure 4:
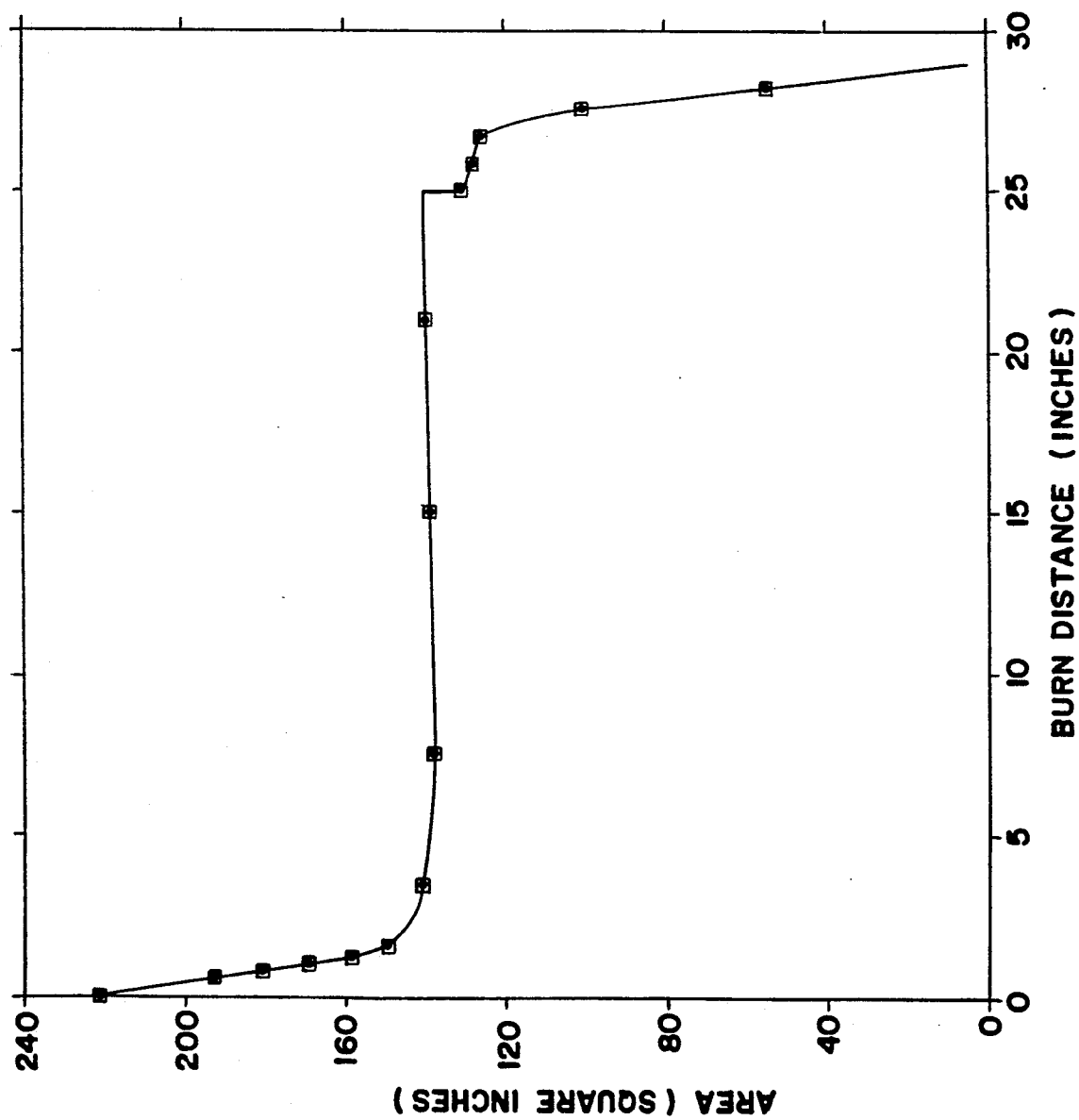
FIG. 4 is a curve showing the performance characteristics of the solid propellant grain of FIG. 3 as a function of the burn distance and burn area.

The following is a glossary of elements and structural members as referenced and employed in the present invention.

| | |
|---|---|
| 11 | gas generator |
| 13 | propellant grain |
| 15 | inhibitor |
| 17 | internal insulation |
| 19 | case |
| 21 | external insulation |
| 23 | internal insulation |
| 25 | forward closure |
| 27 | external insulation |
| 29 | gas outlet assembly |
| 31 | igniter assembly |
| 33 | aft dome section |
| 34 | thickened forward section of case 19 |
| 35, 37, 39, 41 | attachment lugs |
| 43 | thickened section of forward enclosure 25 |
| 45 | o-ring groove |
| 47 | annular retaining key groove |
| 49 | handling holes |
| 51 | retaining key |
| 53 | o-ring |
| 55, 57, 59, 61, 63 | silica phenolic insulation sections |
| 65, 67, 69, 71 | molybdenum liners |
| 73 | internal outlet insulation |
| 75 | titanium elbow casting |
| 77 | columbium reducer |
| 79 | exposed aft surface of the grain |
| 81 | inhibitor after casting but before machining |
| 83 | position of surface of grain after casting but before machining |
| 85, 87, 89 | annular concentric grooves |
| 91 | flat face of grain |
| 93, 95 | chamferred faces of grain |

DESCRIPTION OF THE PREFERRED EMBODIMENTS

Referring now to the drawings wherein like reference numerals are used to designate like or corresponding parts throughout the various figures thereof, there is shown in FIG. 1 a side elevation sectional view of the gas generator assembly of the present invention as indicated by reference numeral 11. FIGS. 1A and 1B show sectional views of the forward and aft ends of the generator of FIG. 1.

Gas generator 11 includes propellant grain 13, inhibitor 15, internal insulation 17, case 19, and external insulation 21. The forward section shown in FIG. 1A includes internal insulation 23, forward closure case 25 and external insulation 27. The aft section shown in FIG. 1B, includes gas outlet assembly 29 and igniter assembly 31. The propellant grain assembly 32 shown in FIG. 6 comprises cylindrical inhibitor 15, solid propellant grain 13 and forward closure assembly 24, also shown in FIG. 1A. Forward closure assembly 24 includes forward closure 25, internal insulation 23 and external insulation 27 attached thereto.

Case 19 of FIG. 1B is of cylindrical configuration with an integral aft dome section 33, a thickened forward section 34 (see FIG. 1A) and attachment lugs 35, 37, 39, and 41. Forward closure 25 has a domed configuration, thickened section 43, o-ring groove 45, retaining key groove 47 and four handling holes 49. The forward closure is attached to the case with a retaining key 51 and is sealed by means of o-ring 53. Gas outlet assembly 29 includes insulation sections 55, 57, 59, 61, and 63, liners 65, 67, 69 and 71, external outlet insulation 73, elbow casting 75 and reducer 77.

The propellant grain is made from an HTPB/HMX composite propellant with flame temperature of about 3,000° F. HTPB/HMX is a hydroxyl terminated polybutadiene polymer propellant system with HMX solid particles used as the oxidizer. The propellant weight is approximately 250 pounds and is a cast-in-sleeve configuration having a length of about 29 inches and a diameter of about 13 inches. The grain is an end burning design with a configured start up surface for added initial burn area and uniform flame front propagation.

The radial surface between the exterior surface of the inhibitor 15 and the interior surface of the insulator 17 is an interference fit having no clearance. This is done to maximize propellant weight, assure mechanical integrity, and eliminate separation of the inhibitor and the propellant grain. The propellant grain assembly is loaded and unloaded by cooling the grain assembly to provide necessary clearance between the inhibitor and insulator and then subjected to normal temperature conditions where the interface has an interference fit.

FIGS. 2, 5 and 6, show propellant grain 13 and inhibitor 15 of propellant grain assembly 32. Between the grain 13 and inhibitor 15 and between the grain and the forward closure assembly 24 is an adhesive bonding system for interconnecting the grain, inhibitor and forward closure assembly. The method of manufacture is to pour the propellant and machine the exposed aft section 79 (see FIG. 2) after the propellant has been cured. This is accomplished by using an elongated inhibitor, as shown by dotted line 81 in FIGS. 2 and 5, and pouring the propellant into the assembly in the vertical position. The cavity is filled with propellant to the position shown by dotted line 83 and allowed to cure. The propellant and inhibitor are then machined as shown and described below.

FIG. 3 shows the desired burn-back pattern. FIG. 4 shows the desired burning surface area progression necessary to accomplish complete burn and proper system operation. System operation consists of meeting ignition characteristics and a flow rate range for a given pressure range dictated by missile requirements. This is accomplished by the unique design of the aft grain configuration which defines the initial burn area. From FIGS. 2 and 6, it can be seen that the grain includes annular concentric grooves 85, 87 and 89, flat section 91 and chamfer sections 93 and 95. The configuration of these grooves, flat section and chamfers along with the tapered grain diameter together define an initial burn area that results in the burn progression of FIGS. 3 and 4. The design considerations include clearance for thermal expansion during storage and operation, clearance for the igniter diffuser mounted in the case, maximizing propellant weight, optimizing surface area progression as shown in FIG. 4, ease of manufacture, and a configuration that assures grain ignition. Grooves 85, 87 and 89 provide the required additional initial surface area to overcome system heat losses and achieve proper initial operating pressures.

Table I shows the characteristics of the propellant grain 13 of FIG. 6 for a HTPB/HMX grain material, flame temperature 3,000° F., and grain weight 232 pounds.

TABLE I

| Grain dimensions (inches) | |
| --- | --- |
| $d_1$ | 13.0 |
| $d_2$ | 12.12–12.04 |
| $d_3$ | 9.82–9.78 |
| $d_4$ | 9.25–9.21 |
| $d_5$ | 7.42–7.38 |
| $d_6$ | 6.79–6.75 |
| $d_7$ | 5.44–5.36 |
| $d_8$ | 2.42–2.38 |
| $d_9$ | 14.25 |
| $d_{10}$ | 13.46–13.42 |
| $d_{11}$ | 13.60–13.56 |
| $d_{12}$ | 13.67–13.63 |
| r | 0.110–0.090 |
| l | 29.0 |
| $l_1$ | 1.16–1.13 |
| $l_2$ | 1.94–1.91 |
| $l_3$ | 8.29–8.27 |
| $l_4$ | 3.01–2.99 |

Slot 87 shown in FIG. 2 provides proper burn pattern and clearance for the diffuser 83 of the igniter assembly under highest temperature storage conditions when the propellant grain expands in the longitudinal direction. The radial interface between the exterior surface of the inhibitor and the interior surface of the insulator is an interference fit having no clearance. This is done to maximize propellant weight and to eliminate separation of the inhibitor and the propellant grain. Elimination of this separation is critical to prevent propellant burnback in the interface between the grain surface and the inhibitor. The propellant grain assembly is loaded and unloaded by cooling the grain assembly to provide the necessary clearances between the inhibitor and insulator and then subjecting the propellant grain to normal temperature conditions which expands the grain to form an interference fit.

FIG. 5 shows an alternate groove configuration used where the propellant grain diameter is larger and the heat losses are smaller.

The constituents and process of the propellant to inhibitor bonding system of the present invention are as follows:

(1) The above described inhibitor and forward closure assembly (which contains insulation 23) are assembled and placed into casting tooling. The inhibitor 15 and interior insulation 21 are made of the same material and generally comprise an ethylene propylene, diene monomer (EPDM/neoprene rubber binders containing silica powder and aramid fibers.) The specific chemical composition is set forth in Tables II & III as follows:

TABLE II (Chemical Composition)

| Function | Ingredient | By Weight Composition in Parts per 100 Parts of Rubber Binder (PHR) | | |
|---|---|---|---|---|
| | | Minimum | Maximum | Nominal |
| Binder | EPDM Elastomer | 79.0 | 81.0 | 80.0 |
| | 2 Chlorobutadiene 1,3 Elastomer | 19.0 | 21.0 | 20.0 |
| Filler | Silica Hydrate | 29.0 | 31.0 | 30.0 |
| Antioxidants | Polymerized Trimethyl Dihydroquinoline | 1.9 | 2.1 | 2.0 |
| | Alkylated Diphenylamines and Diphenyl-P-Phenylendiamene | 0.9 | 1.1 | 1.0 |
| Curing Agent | 40% a,a' Bis (Tert-Butylperoxy) Diisopropylbenzene | 5.5 | 5.7 | 5.6 |
| Processing Aids | Napthenic Process Oil | 4.9 | 5.1 | 5.0 |
| | Synthetic Polyterpene Resin | 4.9 | 5.1 | 5.0 |
| Fiber | Aramid Fiber (.25 inch) | 27.0 | 29.0 | 28.0 |
| Activator | Zinc Oxide, Technical | 4.9 | 5.1 | 5.0 |

TABLE III (Functional Description of Ingredients)

| Ingredient | Description |
|---|---|
| EPDM Elastomer | EPDM elastomer; binder also adds chemical bond sites |
| 2 Chlorobutadiene 1,3 Elastomer | Choroprene elastomer added to improve processing and bonding |
| Silica Hydrate | Mineral filler to improve thermal properties (mixing and packing) |
| Polymerized Trimethylquinoline | Polymerized trimethylquinoline antioxidant prevents aging degredation of the polymer chain |
| Alkylated Diphenylamines and Diphenyl-p-Phenylendiamene | Diphenylamine; antioxidant used in combination with above for high temperature storage conditions |
| 40% a,a' Bis (Tert-Butylperoxy), Diisopropylbenzene (curative) | 40% active peroxide supported on Burgess KE clay; curative for both polymers also provides aging stability as compared to Sulfur, for example. |
| Napthenic Process Oil | Lubricating oil; improve mixing |
| Synthetic Polyterpene Resin | Tackifier added to improve green tack (adhesion between uncured layers) |
| Aramid Fiber (.25 inch) | Aramid fiber reinforcement; improved char retention and thermal properties |
| Zinc Oxide | Activator for curing agent |

The following are the process steps used to prepare the uncured thermal insulation and inhibitor composition.

(1) The initial batch includes mixing the binders, antioxidants, processing aids and catalyst. A Banbury mixer is used for approximately 2 minutes.

(2) The fiber filler is then mixed with the step (I) constituents. A Banbury mixer is used for three sub-mixes each for approximately one minute.

(3) The curative is then mixed with the step (2) constituents. A Banbury mixer is used for approximately one minute to form a slab about 4 inches thick, one foot wide and from one to two feet long.

(4) The mixed slab of step (3) is then calendered to about 0.1 inch thick.

(5) The calendered material of step (4) is then remixed in a Banbury mixer for about one minute to form a mixed slab as defined in step (3).

(6) The mixed slab of step (5) is then calendered to about an 0.1 inch thick sheet having a 4 foot width.

(7) A thin plastic cover sheet is applied to one surface of the step (6) uncured insulation sheet and rolled for subsequent use.

(8) When used; the uncured insulation is cut to proper configuration; the configured insulation is laid up and the plastic sheet is removed. If additional insulation thickness is required another piece of uncured insulation is cut to proper configuration and laid up against the first uncured insulation sheet and the plastic sheet is removed. The first and second sheets are tacky and are pressed together to form contiguous insulation sheets. The process is repeated until the total desired uncured insulation thickness is achieved.

(9) The uncured insulation of step (8) is then cured by subjecting it to elevated temperatures wherein the time and temperature is dependent upon the total thickness of uncured insulation. The inhibitor sleeve has a nominal thickness of about 150 mils, a length of about 30 inches and a diameter of about 13 inches.

(10) The inner surface of the cavity formed by inhibitor sleeve 15 and insulator 23 is cleaned with a methyl ethyl ketone (MEK) dampened lint free cloth and is then dried for at least 60 minutes.

(11) A barrier coat is then brush applied to the interior surface of the cleaned cavity. The barrier coat is an epoxy resin with amine curing agent such as Scotchcast-8 TM (made by The Minnesota Mining and Manufacturing Co.). The barrier coat is brush applied to a nominal weight of about 0.35 pounds or about 3-4 mils thickness.

(12) The barrier coat is then cured wherein the cure time and temperature is 24 hours minimum at 60° to 90° F. plus 1 hour minimum at 170°±5° F.

(13) A liner is then brush coated onto the cured interior surface of the barrier coat. The inhibitor sleeve and forward closure are preheated to 170° F. for 2 to 6 hours prior to liner application. The liner is applied in two brush coats and has a final nominal weight of about 0.25 pounds or 2-3 mils. thickness. The chemical composition of the liner is carbon black, isophorone diisocyanate liquid, polybutadiene liquid hydroxyl terminated (type II), and ferric acetylacetonate. The mixing process of the uncured liner material is as follows:

(a) Add polybutadiene liquid hydroxyl terminated (type II) and ferric acetylacetonate to mixer and blend 1 hour minimum at low speed with mix temperature 160°±10° F. Cool to 90°±10° F. before further processing.

(b) Add isophorone diisocyanate and blend 10 minutes minimum at low speed.

(c) Screen carbon black through a 100 mesh screen using Ro-Tap with approximately 5 mm diameter glass beads. Add approximately ⅓ of the carbon black to mix and blend for 10 minutes minimum at low mixer speed. Repeat mixing step for each of the two remaining portions of carbon black.

(d) When all ingredients have been added and mixed, run mixer at low speed for 60 minutes minimum under vacuum of 25 inches of mercury minimum.

Mix temperature shall not exceed 90° F. Break vacuum with nitrogen or argon.

(e) Clean storage cans and lids with solvent and allow to air dry. Transfer mix to 1 quart cans, or 1 pint cans. Purge cans with nitrogen or argon before filling. After filling, flush with nitrogen or argon before installing lids.

(f) Store in deep freeze at 0°±10° F.

(14) The liner is then cured for a total time of 72 to 96 hours at a temperature of 170° F.±5° F. If propellant casting operations are not to begin immediately purge with nitrogen and seal. The lined assembly may be stored up to 2 weeks maximum before casting at 60° to 90° F.

(15) The propellant is manufactured and then cast into the lined cavity. The propellant materials are HMX Class I, carbon black, isophorone diisocyanate, and polybutadiene liquid hydroxyl terminated (type II).

(a) The mixing process of the uncured propellant begins by adding the polybutadiene liquid hydroxyl terminated (type II) and the carbon black to mixer. The carbon black shall be added within 4 hours maximum of removal from "in use" storage. Blend the ingredients for 5 minutes at atmospheric pressure and then under vacuum for 15 minutes at a minimum vacuum of 28 inches of mercury. The vacuum shall be broken with nitrogen. While mixing, add ground Class 1 HMX utilizing a vibrating feeder. This mixing shall be for a minimum of 40 minutes at atmospheric pressure. While mixing, add the unground Class 1 HMX utilizing a vibrating feeder. This mixing shall be for a minimum of 45 minutes at atmospheric pressure followed by blending for a minimum of 1 hour at a minimum vacuum of 28 inches mercury. Vacuum shall be broken with nitrogen.

(b) Remove sample for moisture analysis and total solids test.

(c) Add IPDI, mix 10 to 12 minutes, at atmospheric pressure. Blend under vacuum at a minimum vacuum of 28 inches of mercury for 90 minutes. During the final mixing, the mixer shall be run at its slowest speed and the water jacket temperature adjusted to yield a final mix temperature of 140°±5° F. Break vacuum with nitrogen. The propellant shall be cast within 10 hours maximum upon completion of mixing.

(d) The casting process of the uncured propellant begins by preheating the casting hardware assembly 2 to 6 hours at 170°±10° F. prior to casting if not already hot from the liner cure.

(e) The hopper shall be loaded with propellant and replenished as necessary during casting. The hopper water jacket temperature is maintained at 140°±10° F. and relative humidity is maintained at 30 to 60% during casting.

(f) Evacuate the inhibitor sleeve/closure assembly to a pressure of not less than 5 mm of mercury. Close off vacuum line to inside of inhibitor sleeve, but maintain vacuum on outside of inhibitor sleeve to prevent sleeve from collapsing during casting. Open hopper valve to allow propellant to flow into inhibitor sleeve, allowing pressure in the sleeve to be not more than 20 mm of mercury until the propellant level is approximately 1 inch from bottom of casting tooling "clamp" ring, discontinue breaking vacuum and add propellant to obtain correct height of maximum of 2 inches from bottom of "clamp" ring. Close hopper valve and break vacuum. Remove casting hopper and measure propellant level. If insufficient propellant, replace casting hopper, evacuate the sleeve to a pressure of not more than 120 mm of mercury and cast additional propellant. Release vacuum on inside of sleeve first, then release vacuum on outside of sleeve.

(g) The propellant is then cured, thereby bonding the propellant to liner inhibitor 15, by sealing the end of the casting cylinder and applying nitrogen gas at a pressure of 40±5 psig for the first 60 hours minimum of cure. The propellant shall be cured for a total time of 140 to 164 hours at 170° F.±5° F. Total deviations from propellant cure temperature totaling one hour are permitted provided that the excursion temperatures are greater then 40° F. and less than 200° F. Total deviations in excess of one hour and less than 12 hours are permitted provided the excursion temperatures are less than 130° F. and greater than 90° F. The total propellant cure time is to be extended by the total time of propellant cure temperature excursion below 165° F.

(h) The nitrogen gas shall be released and the grain assembly allowed to cool 1 hour minimum after cure.

After the above described manufacturing and curing process the assembly is then machined as previously described and as shown in the FIG. 4.

Because of the severe temperature, time, pressure and load conditions put on a gas generator of the type described it is critical that the metal case to non-metal bonding system be effective under adverse conditions. The present invention provides such a bonding system the details of which are as follows:

(1) The titanium case (6AL-4V) is sandblasted with a 180 grit aluminum oxide abrasive to a surface roughness not to exceed 125.

(2) The interior sandblasted surface is then cleaned by using a lint free cloth dampened in methyl ethyl ketone (MEK) solvent.

(3) A corrosion resistant coating is then applied such as Chemlok 205 TM (rubber to metal adhesive primer made by Lord Chemical Products) by brush application and having a nominal thickness of 1-2 mils. Chemlok 205 TM, for example, is a chlorinated resin and phenolic blend in 79% solvent with 5 percent titanium dioxide and 1% zinc oxide.

(4) The corrosion resistant coating is then air dried at ambient temperature and atmosphere for at least 60 minutes.

(5) A metal to rubber adhesive coating is then applied such as Chemlok 252 TM by brush application and leaving a nominal thickness of 1-2 mils. Chemlok 252 TM, for example, is a chlorinated resin with EDPM rubber curing agent.

(6) The rubber adhesive coating is then air dried at ambient temperature and atmosphere for at least 60 minutes.

(7) Uncured insulation material is then laid up against the interior surface of the air dried rubber adhesive coating. Several layers are used until the desired insulation characteristics (defined by thickness or weight) are achieved. Each layer adheres to the next since the uncured material is tacky. Between each layer a vacuum bag is inserted and a vacuum is pulled between the bag and the insulation material to attach adjacent layers of material. The insulation material preferable has plastic backing for storage and handling purposes.

A specific example of the lay-up process for the sheets of uncured insulation is as follows:

1. For the metal aft dome insulation cut five patterns, four patterns of approximately 0.100 inch thick and 1 additional pattern (thickness as required of insulating material). Pattern sizes are nominal in inches as follows:

TABLE IV

| Pattern | OD | ID | Thickness |
|---|---|---|---|
| 1 | 14.60 | 2.670 | .100 |
| 2 | 14.60 | 2.425 | .100 |
| 3 | 14.70 | 2.290 | .100 |
| 4 | 14.75 | 2.155 | .100 |
| 5 | 14.80 | 2.030 | As required |

2. For the metal case insulation cut five patterns of approximately 0.100 inch thick insulating material. Pattern sizes are nominal in inches as follows:

TABLE V

| Pattern | Width | Length Bottom | Length Top |
|---|---|---|---|
| 1 | 26 13/16 | 45¼ | 45¼ |
| 2 | 26 | 45 | 44 11/16 |
| 4 | 25½ | 43¼ | 43¾ |
| 5 | 6½ | 42¼ | 42¼ |

The grain direction of the insulation material shall run axially with the motor case.

3. Lay dome patterns on table and clean top side with MEK and allow to air dry 10 minutes minimum.

4. Place patterns 1 and 2 clean sides mating into a dome preform fixture. Leave plastic backing on the outsides.

5. Place patterns 3 and 4 in similar condition. Remove plastic backing from outside of pattern 4 and clean with MEK. Allow to air dry 10 minutes minimum. Place pattern 5, clean, unprotected side on pattern 4. Leave plastic backing on outsides of patterns 3 and 5. Place patterns into a dome preform fixture.

6. Place mold assembly into a press and pressurize to 5–8 tons for 5–8 minutes minimum. Allow insulating material to stay in mold until needed.

7. Remove dome insulation from fixture. Remove the plastic backing and clean with MEK. Allow to air dry 10 minutes minimum.

8. Place pattern into the case first, locating the edge the distance from case retaining key groove. Smooth the pattern against the inside of case. Wipe the pattern surface with MEK and allow to air dry 10 minutes minimum. Filtered circulating air is to be used for approximately 2 minutes.

9. Install conventional cure ring in case. Install an oven film bag and fasten to cure ring with vacuum sealer or equivalent. Attach vacuum lines to fittings on cure ring and elbow connector and pull vacuum (24 inch Hg) for 10 minutes minimum.

10. Remove cure ring, oven film bag and vacuum lines. Cure ring may be left in place.

11. Install two ply dome insulation piece into case. Align insulation hole with entrance to outlet.

12. Pull vacuum per Steps 9 and 10.

13. Install remaining dome insulation piece into case per steps 11 and 12.

14. Install remaining patterns individually per steps 9 and 10.

15. Using new O-rings, install case cure ring into end of case and install conventional retaining key cure plug. Place teflon glass fabric on dome and side wall full length. Install cure bag into gas generator case. Secure cure bag to cure ring with rubber strip and hose clamp. Remove gas generator case assembly from handling fixture and place on cart and secure. Install ortman key plug and apply vacuum sealer or equivalent to all sealing areas of case.

16. Pull vacuum of 24 inches Hg for 30 minutes minimum. Ensure that cure bag has all the wrinkles out, is seated correctly and there are no leaks. This step may be performed after installation into an autoclave but prior to the start of the heating of the autoclave.

17. Move case to the autoclave. Place gas generator case on cure cart and install in autoclave.

18. The insulation, adhesive and casing are now cured which results in a bonding between the case and insulation. A specific example of the autoclave curing process is as follows:

(a) Attach vacuum line from pump to vacuum fitting on case outlet.

(b) With assembly under a vacuum of 24 inches of mercury minimum, start heating autoclave to 160° F.±10° F. and maintain for 2.0–3.0 hours at temperature.

(c) Start air compressor and pressurize assembly to 125–145 psig and increase the temperature to 195° F.±10° F. Maintain temperature and pressure for 1.5–2.0 hours.

(d) Increase autoclave temperature to 325° F.±10° F. and maintain for 3.5–4.0 hours. Note: Any deviation from the required temperature tolerance of 10° F. or less for a total of 15 minutes or less will be acceptable as long as the actual cure time to the required temperature is within the required cure time tolerance except when the temperature deviates above the temperature requirement.

(e) Maintain 125–145 psig until autoclave temperature reaches 150° F. This cool down period shall not be less than 30 minutes.

(f) Release pressure, remove assembly from autoclave and allow to cool to ambient.

(g) Remove all fittings, cure bag, and glass fabric from gas generator case. Clean case as necessary using MEK.

19. After the completion of step 18 the interior surface is machined to final dimensions for receiving the propellant grain assembly.

This invention is not limited to the preferred embodiment and alternatives heretofore described, to which variations and improvements may be made, without departing from the scope of protection of the present patent and true spirit of the invention, the characteristics of which are summarized in the following claims.

What is claimed is:

1. A solid propellant grain assembly for use in a gas generator comprising:
  a cylindrical inhibitor and a solid propellant grain having a forward end and a outer cylindrical surface attached to the interior cylindrical surface of said inhibitor, and an aft end of said propellant grain including a surface with a plurality of circular spaced grooves to increase the burn area, said grooves respectively comprising inner, middle and outer spaced circular grooves.

2. The solid propellant grain assembly of claim 1 wherein said inner, middle and outer grooves have V-shaped cross sections wherein the acute angle of the V-shaped cross section of the inner and outer grooves are about the same and the acute angle of the V-shaped cross section of the middle groove is greater than the acute angle of the V-shaped cross sections of the inner and outer grooves.

* * * * *